United States Patent Office 2,789,542
Patented Apr. 23, 1957

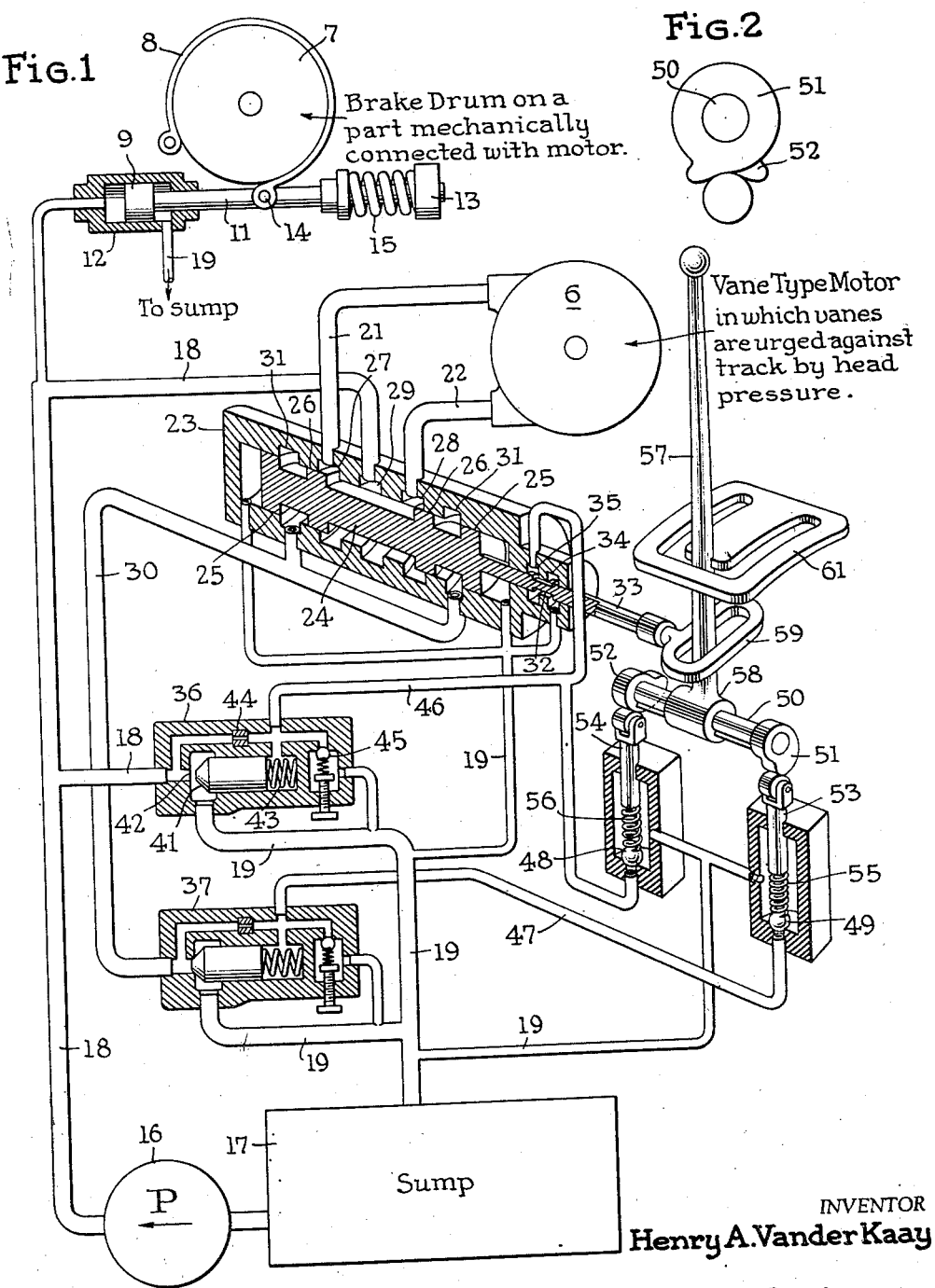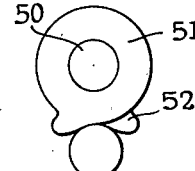

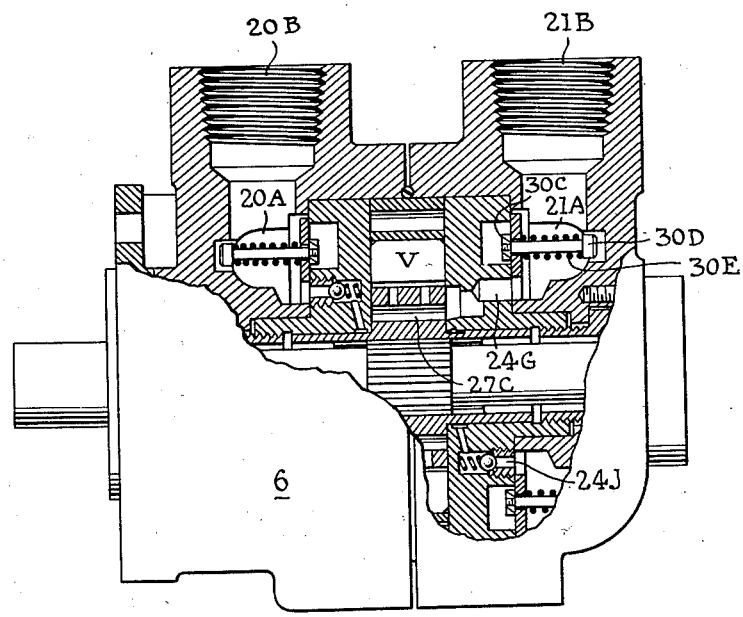

2,789,542

HYDRAULIC MOTOR CONTROL SYSTEM

Henry A. Vander Kaay, Royal Oak, Mich., assignor to The New York Air Brake Company, a corporation of New Jersey Application September 23, 1953, Serial No. 381,845

7 Claims. (Cl. 121—39)

This invention relates to controls for systems in which a hydraulic motor of the expansible chamber type receives motive fluid from a pressure source such as a constantly running pump and must be started and stopped by some sort of valve control and, in most cases, must be reversed with identical controls effective for each direction of motion. A motor reversible by interchanging its terminal port is used. Special problems are encountered in maintaining motor and valve cavities, passages, and all conduits full of the liquid and free of voids. This is particularly true when the rotary motor is of the hydraulically loaded vane type. While the use of this type motor is not essential to the control scheme, a motor of this type will be described to show how the invention is adaptable to systems availing of the desirable characteristics of such vane type motors.

Where hydraulic motors are used, the apparatus shifted by the motor is commonly massive and develops considerable momentum. To handle the load smoothly, graduated acceleration and graduated deceleration, each with precise control of its graduation, are needed. Interrelation of the two graduating controls greatly facilitates manipulation.

These results are secured by using a graduating relief valve to limit variably the supply pressure to the motor, and another graduating relief valve to develop a controllable back pressure on the discharge flow from the motor. The first of these controls acceleration, and the second controls deceleration.

The two graduating relief valves are normally set for low pressures, and manually operable means are provided to intensify selectively their settings. These means can vary in character, but preferably take the form of two adjustable back-pressure valves each one for modifying the control point of a corresponding one of the graduating relief valves, and a unitary controller reversely shiftable to load the back pressure valves selectively, each in variable degree.

In cases where the motor is reversible, the unitary controller is given motion in two planes, in one of which it actuates the back pressure valves (or their equivalent) selectively and in reverse senses, and in the other of which it shifts a port-interchanging valve to connect the motor to run in either of two opposite directions. This port-interchanging valve can be so contrived as to afford a mid-position, in which it completely unloads the pressure source, and if desired also de-energizes a spring-loaded brake-releasing motor and so permits a "parking" brake to apply and lock the load when such unloading occurs.

An important feature of the invention is the fact that in either forward or reverse setting, including "neutral" positions the motor is kept under sufficient hydraulic pressure to assure that the vanes are held in sealing contact with the track. This solves, without resort to auxiliary pumps or other pressure sources, the problem of maintaining the motor continuously under pressure. This is particularly important during deceleration, and important during starting and coasting as well.

Thus by the use of distinct supply and back pressure controls, flexible acceleration and deceleration characteristics are had, and this with the port reversing valve gives the necessary control of starting, running, and stopping conditions, and permits the use of a very simple friction brake effective whenever the operator's control is set in unloading position, or when the system is shut down. The brake also constitutes an emergency stopping means in the event of any of a variety of possible failures to other system components.

The invention will now be described by reference to the accompanying drawing in which:

Figure 1 is a diagram, in perspective and not to scale, indicating the essential elements of the system and their connections. The parts are shown as they would appear with the operator's control in unloading position, the motor stopped, and the friction brake applied.

Figure 2 is a fragmentary section showing the cams which selectively actuate the loading stems of the vent valves. This is neutral or coasting position.

Figure 3 is a view part in elevation and part in section showing a reversible vane type motor in which the vanes are urged against the track by head pressure.

The motor 6 may be any expansible chamber motor reversible by interchanging its inlet and discharge. Fig. 3 shows a vane motor of acceptable type in which the vanes are urged against the track by head pressure. This figure is a simplified version of Fig. 1 of the patent to Rosaen 2,636,481, April 28, 1953. Some advantages of the invention can be had where reversal is not needed, and in such case the choice of motor is wider. Rotary motors are desirable in installations in machine tools, hoists and the like, and as indicated by legend on the drawing a vane type motor may be used and is preferred.

Some vane type motors have spring-loaded vanes, but the better ones have hydraulically loaded vanes, the loading pressure being derived from the liquid inlet in most cases. Since the invention contemplates retardation by development of back-pressure in the motor discharge some provision must be made for maintenance of inlet pressure sufficient to hold the vanes in sealing contact with the track, in any case where the vanes are loaded by inlet pressure. The invention includes means to that end.

As additional examples of vane motors with hydraulically loaded vanes reference is made to patents to Oscar E. Rosaen notably 2,521,997, September 12, 1950.

Referring now to Fig. 3, the housing of motor 6 has connections 21B and 20B which may be interchanged as supply and discharge for reversal of the direction of rotation of the motor. If 21B is the inlet, flow is via 21A, 24G and 27C to the bottom of the radial slot in which vane V moves, so as to force the vane outward against the track.

If further detailed information about the commercial Rosaen vane motor is desired, reference may be made to Patent 2,636,481. Numerals from that patent have been used on Fig. 3, to assure correct interpretation. These indicate a check valve 24J and one of the sequence valves 30C with valve guide 30D and valve spring 30E. It will be readily apparent to anyone familiar with the Rosaen motor that when 20B is inlet and 21B is discharge, head pressure will reach 27C by a port which is the analog of port 24G, is not shown in Fig. 3, but leads from 20A. Details of construction of the motor are not directly involved in the present invention.

For reasons just stated the head pressure line is maintained under at least a moderate pressure during acceleration and deceleration of the motor. This offers opportunity to include a "parking" brake to hold the motor and its load at rest. To do so a brake drum 7 is connected with motor 6 and is braked by band 8. A piston 9 on rod 11 works in brake cylinder 12, is supported by guide 13, is connected at 14 to the brake 8 and is loaded in a brake applying direction by coil compression spring 15.

A constantly running pump 16 draws liquid (oil) from the sump 17 and delivers it to line 18 under pressure. The working space in cylinder 12 communicates with the head pressure line 18. Except when the control lever is in unloading position, the pressures normally maintained in line 18, when the pump is running, are sufficient to overpower spring 15 and hold the brake released.

Head pressure line 18 and all branches in free communication therewith will be identified by the same reference numeral. The same practice is followed as to the low pressure line 19 which drains to sump 17.

The terminal connections 21 and 22 of motor 6 lead to the housing 23 of the port-interchanging valve. This may take various forms, but is shown as a symmetrical balanced piston valve 24 having end lands 25 for balancing purposes and two port controlling lands 26. Valve 24 is reciprocable in a cylinder in housing 23 having a port groove 27 to which connection 21 leads, a port groove 28 to which connection 22 leads and a supply groove 29 to which supply pressure line 18 leads. The back pressure line 30 is connected to each of two discharge grooves 31 in the housing. The spaces at opposite ends of the valve are drained to the sump 17 by branches of line 19.

The valve 24 is shifted by rod 33 which extends through a closely fitting guide-way in the end of housing 23. The rod 33 has a reduced portion 32 which when the valve is in mid-position connects two groove ports 34 and 35, one connected to sump line 19 and the other to line 46 hereinafter described. In that midposition the connections 21 and 22 communicate with each other and with head-pressure line 18.

In the two limiting positions of valve 24 the ports 34 and 35 are disconnected and a selected one of connections 21 or 22 is connected with head-pressure line 18 and the other with back pressure line 30. This interchange of connections 21, 22 is the means provided for motor reversal.

To control acceleration, the head pressure in line 18 is modulated by bleeding liquid from line 18 to line 19 through an adjustable valve generally indicated by the numeral 36 applied to its housing. To control deceleration, back pressure in line 30 is modulated by bleeding liquid to line 19 through a second adjustable valve generally indicated by the numeral 37 applied to its housing. The valves 36 and 37 are identical and are an adaptation of a known adjustable pressure-relief valve, in which the adjustment is effected hydraulically. Since the valves 36 and 37 are structurally identical only 36 need be described in detail.

The part 41 is a combined piston and poppet valve which coacts with seat 42 and is biased in a closing direction by a spring 43. Head pressure line 18 is connected to seat 42 and to choke 44 which leads to the cylinder space behind the piston portion of part 41. Pressure in this space may be relieved by the spring-loaded vent valve 45, by the undercut 32 of valve 24 or by the valve 48. Relief flow from line 18 is through a side port to a branch of line 19 as indicated in the drawing. Valve 45 is adjustable, and is merely a safety device set for the top permissible pressure, say 2000 p. s. i. Undercut 32 allows relief flow from line 18 at a pressure low enough to assure setting of brake 8. Pressure control for acceleration is effected by variably controlling venting flow through line 46.

In valve 37 the line 30 leads to the analog of seat 42 and pressure control is effected by variably controlling venting through line 47. The analog of valve 45 is also set for top back-pressure, say 2000 p. s. i.

The vent lines 46, 47 respectively are controlled by respective back-pressure valves 48, 49 whose spring loading is adjustable simultaneously by common means, which will now be described.

A shaft 50 rotatable in fixed bearings (which are not shown) carries two reversely-set cams 51, 52. These engage follower rollers on plungers 53, 54 which function as adjustable seats for the springs 55, 56 arranged to load the valves 48, 49. Figure 2 shows the cams in a neutral (coasting) position in which both springs 55, 56 are lightly stressed, i. e., each under the lowest stress to which it is subjected. This does not mean that the springs are then equally stressed. They are stressed to establish desired minimum pressures. Preferably, in this position, the back pressure line 30 would be vented to negligible pressure, and head pressure line 18 to a pressure great enough to insure projection of the vanes. Such a pressure value, say 200 p. s. i. would be ample to hold brake 8 released.

Rotation of shaft 50 in opposite directions from the position of Figure 2 would load the springs 56, 55 selectively, the spring not loaded retaining its initial setting unchanged. The loading of these springs increases the setting of the valves 36 and 37. A top setting of 2000 p. s. i. for each is typical.

A controller lever 57 has a hub 58 splined to shaft 50, so as to be shiftable axially thereon. The lever passes through the cross-slot in a yoke 59 fixed to the end of rod 33 and is limited in its motion by the U-shaped slot in plate 61 which is fixed in position by means not shown.

In the position shown in Figure 1, the pump may run but is completely unloaded, and all other parts are at rest. Reduction of pressure in line 18, which necessarily results from unloading of the pump, causes brake 8 to apply.

To start the motor 6 in one direction or the other, the lever 57 is shifted from the unloading position of Figure 1 into one or the other arm of the U-shaped slot. This loads the pump but does not start motor 6 because valve 36 opens at the low pressure necessary to project the vanes. The cam position shown in Figure 2 is reached at mid-length of the slot. This is neutral position, and there are two neutral positions, one in each arm of the U, one being for forward and the other for backward turning of the motor 6. From each neutral position, motion toward the "top" of the U increases head pressure and causes acceleration whereas motion from either neutral position toward the "bottom" of the U increases back pressure (while head pressure is low) and so causes deceleration.

It is important to observe that friction braking is not ordinarily used to stop the load though it is always available in emergency. Acceleration and deceleration are each brought about in the ordinary case by hydraulic reactions. Consequently very smooth and accurate control of even very heavy machinery is possible, and the two reactions being similarly effected match each other and give a "feel" that leads quickly to almost instinctive manipulation.

The control can be used without the reversing feature, or without the brake or without either. Various motions may be substituted. Various refinements may be introduced into the design of the port reversing valve and the pressure relief valves. While I prefer to adjust the valves 36, 37 hydraulically, as indicated, because this relieves limitations on the location and size of lever 57, other schemes of adjustment known in the relief-valve art can be substituted.

What is claimed is:

1. In a hydraulic motor system, the combination of means for supplying liquid under pressure; an adjustable pressure limiting valve having a normal low pressure setting from which it is adjustable in a pressure increasing direction; an expansible chamber hydraulic motor; a second adjustable pressure limiting valve having a normal low pressure setting from which it is adjustable in a pressure increasing direction; conduit means defining a liquid confining flow path from said supply means to the first limiting valve, thence to and through the motor and from the motor to the second limting valve whereby the first limiting valve serves to limit the pressure of liquid supplied to the motor and the second limiting valve serves to limit back pressure against which the discharge of liquid from the motor occurs; a controller shiftable reversely from a neutral position and operatively connected to adjust said limiting valves selectively, each in a pressure increasing direction as the controller is moved reversely from said neutral position.

2. In a hydraulic motor system, the combination of means for supplying liquid under pressure; two adjustable pressure limiting valves each including a main valve subject in an opening direction to the pressure to be limited and in a closing direction to pressure in a regulatory chamber with means for supplying pressure fluid thereto at a limited rate; an expansible chamber hydraulic motor; conduit means defining a liquid confining flow path from said supply means to the first limiting valve thence to and through the motor and from the motor to the second limiting valve whereby the first limiting valve serves to limit the pressure of liquid supplied to the motor and the second limiting valve serves to limit back pressure against which the discharge of liquid from the motor occurs; two normally lightly loaded back pressure valves each connected to vent the corresponding one of said regulatory chambers; and manually operable means for selectively increasing the loading of said lightly loaded back pressure valves.

3. In a hydraulic motor system, the combination of means for supplying liquid under pressure; an adjustable pressure limiting valve having a normal low pressure setting from which it is adjustable in a pressure increasing direction; an expansible chamber hydraulic motor; a second adjustable pressure limiting valve having a normal low pressure setting from which it is adjustable in a pressure increasing direction; conduit means defining a liquid confining flow path from said supply means to the first pressure limiting valve, thence to and through the motor and from the motor to the second pressure limiting valve whereby the first pressure limiting valve serves to limit the pressure of liquid supplied to the motor and the second pressure limiting valve serves to limit back pressure against which the discharge of liquid from the motor occurs; a port interchanging valve shiftable between two positions and serving to interchange the terminal connections of the motor whereby the direction in which the motor operates is reversed; a shiftable controller having two distinct motion characteristics, in the first of which it shifts said port reversing valve between its two functional positions and in the other of which it adjusts said pressure limiting valves selectively, each in a pressure increasing direction during motion of the controller reversely from a neutral position; and guiding means for said controller arranged to render its motion characteristic selective.

4. In a hydraulic motor system, the combination of means for supplying liquid under pressure; two adjustable pressure limiting valves each including a main valve subject in an opening direction to the pressure to be limited and in a closing direction to pressure in a regulatory chamber with means for supplying pressure fluid thereto at a limited rate; an expansible chamber hydraulic motor; conduit means defining a liquid confining flow path from said supply means to the first pressure limiting valve thence to and through the motor and from the motor to the second pressure limiting valve whereby the first pressure limiting valve serves to limit the pressure of liquid supplied to the motor and the second pressure limiting valve serves to limit back pressure against which the discharge of liquid from the motor occurs; two normally lightly loaded back pressure valves each connected to vent the corresponding one of said regulatory chambers; a port-reversing valve serving to interchange the terminal connections of said motor; and manually operable means having two mutually exclusive motion characteristics in one of which it shifts said port-reversing valve and in the other of which it selectively increases the loading of said lightly loaded back pressure valves according to its direction of motion from a neutral position.

5. The combination defined in claim 4 in which the motor is of the vane type, the vanes are hydraulically urged to their sealing positions by pressure of supply liquid and the minimum loading of that lightly loaded back pressure valve which controls said first pressure limiting valve is sufficient to maintain the necessary hydraulic sealing force on the vanes.

6. In a hydraulic motor system, the combination of means for supplying liquid under pressure; two adjustable pressure limiting valves each including a main valve subject in an opening direction to the pressure to be limited and in a closing direction to pressure in a regulatory chamber with means for supplying pressure fluid thereto at a limited rate; an expansible chamber hydraulic motor; conduit means defining a liquid confining flow path from said supply means to the first pressure limiting valve thence to and through the motor and from the motor to the second pressure limiting valve whereby the first pressure limiting valve serves to limit the pressure of liquid supplied to the motor and the second pressure limiting valve serves to limit back pressure against which the discharge of liquid from the motor occurs; two normally lightly loaded back pressure valves each connected to vent the corresponding one of said regulatory chambers; a port-reversing valve serving to interchange the terminal connections of said motor in its two limiting positions and having an intermediate position in which it vents freely the regulatory chamber of the first pressure limiting valve; and manually operable means having two mutually exclusive motion characteristics in one of which it shifts said port-reversing valve and in the other of which it selectively increases the loading of said lightly loaded back pressure valves according to its direction of motion from a neutral position.

7. The combination with the system defined in claim 6 of a friction brake arranged to hold said motor at rest; a brake cylinder motor communicating with that portion of the conduit means which is connected with the first pressure limiting valve, and urging the brake in its releasing direction; and yielding means urging said brake in an applying direction but of such strength as to be overpowered by said brake cylinder motor except when the regulatory chamber of said first pressure limiting valve is vented.

References Cited in the file of this patent
UNITED STATES PATENTS

| | | |
|---|---|---|
| 2,138,208 | Rosen | Nov. 29, 1938 |
| 2,229,419 | Merrill | Jan. 21, 1941 |
| 2,339,604 | Linden et al. | Jan. 18, 1944 |
| 2,527,943 | Lee | Oct. 31, 1950 |
| 2,617,389 | Munschauer | Nov. 11, 1952 |
| 2,663,995 | Price et al. | Dec. 29, 1953 |